I. FISHER.
INDEX OR FILE.
APPLICATION FILED NOV. 3, 1913.
1,145,411.
Patented July 6, 1915.
3 SHEETS—SHEET 1.
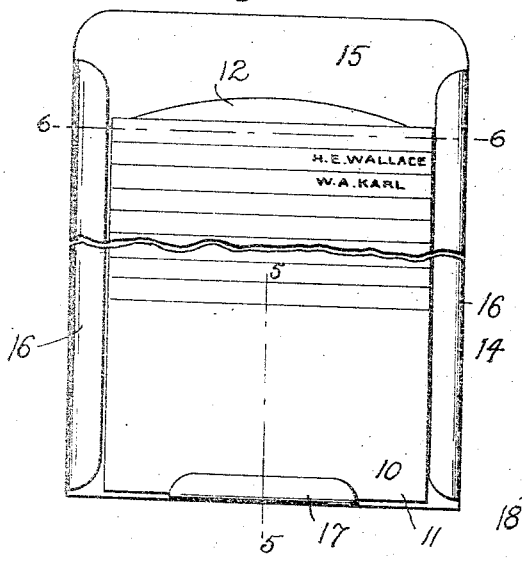
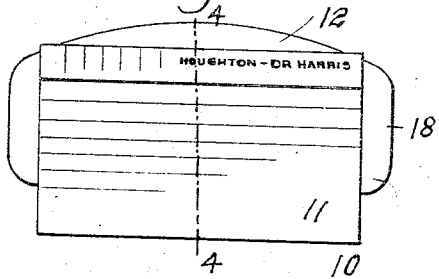
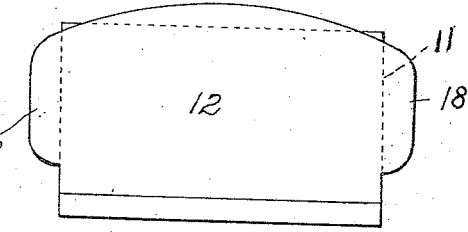
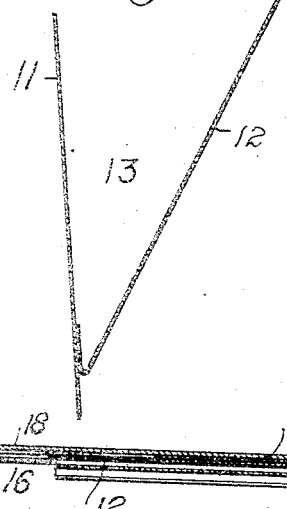
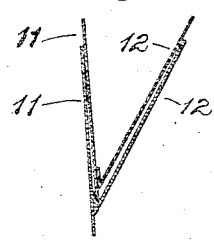
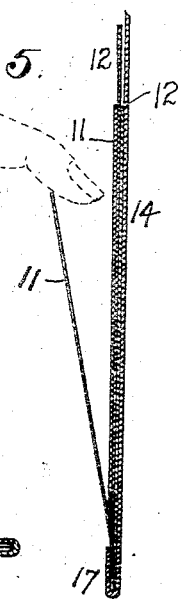
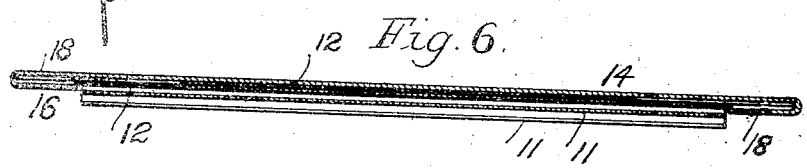
WITNESSES:
Belle I. Ackley
Hattie E. Cooper.
INVENTOR:
Irving Fisher,
BY
Henry E. Wilcox
ATTORNEY.

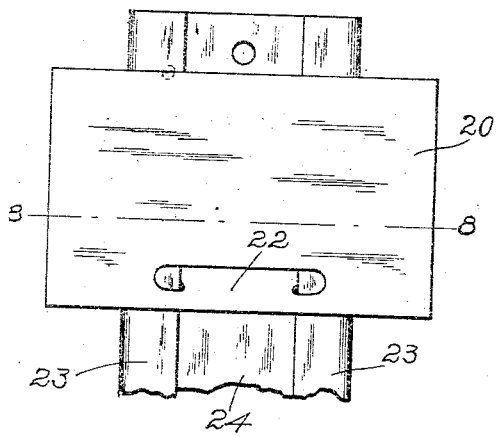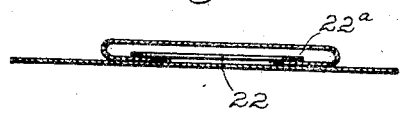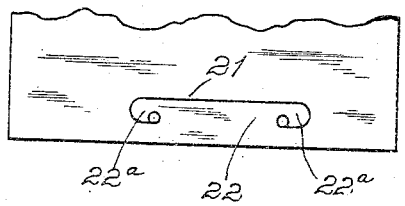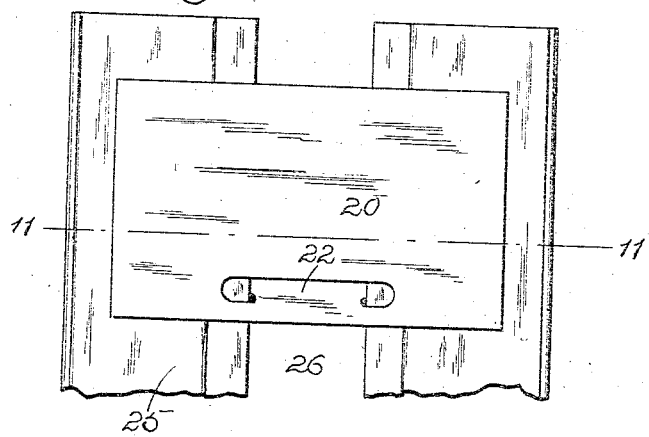

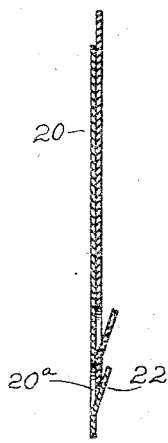
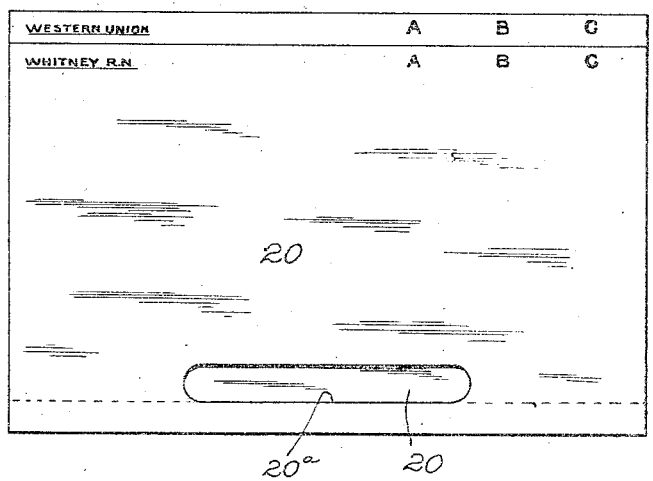
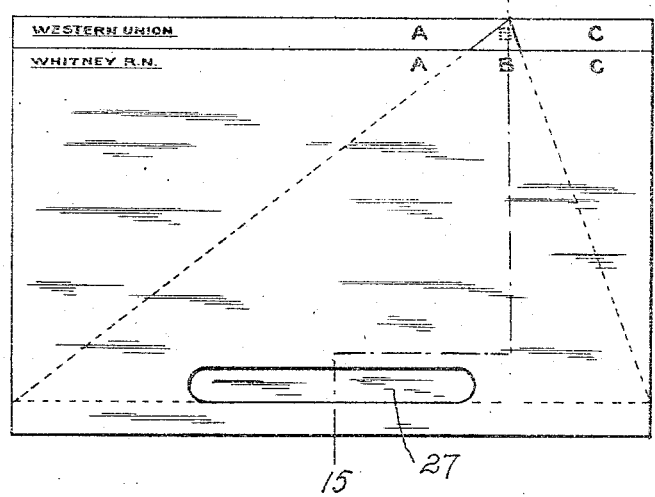
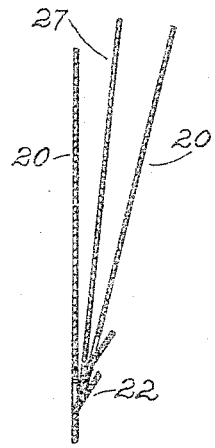

UNITED STATES PATENT OFFICE.

IRVING FISHER, OF NEW HAVEN, CONNECTICUT, ASSIGNOR TO INDEX VISIBLE, INCORPORATED, OF NEW HAVEN, CONNECTICUT, A CORPORATION OF NEW YORK.

INDEX OR FILE.

1,145,411.   Specification of Letters Patent.   Patented July 6, 1915.

Application filed November 3, 1913. Serial No. 798,954.

*To all whom it may concern:*

Be it known that I, IRVING FISHER, of the city and county of New Haven and State of Connecticut, have invented certain new and useful Improvements in Indexes or Files, of which the following is a full, clear, and exact description.

This invention relates to indexes or files, and more particularly to an index, file, list or directory of that class in which a plurality of substantially flat record members are arranged to overlap each other to a certain extent, so that margins of said members are visible at all times, and wherein such record members are carried by and slidable lengthwise of a suitable support.

The present invention resides in certain improvements in the record members themselves whereby they are held overlapped to a predetermined extent and slidably supported and guided on or in a supporting frame or guide.

The improvements also consist in the correlation or combination of a certain type of record member with a certain type of support or guide whereby the device as a whole is simplified in construction and whereby the record members may be individually placed in and removed from the guide in any desired arrangement with facility and convenience.

To these and other ends, the invention consists in the novel features and combinations of parts to be hereinafter described and claimed.

In the accompanying drawing, Figure 1 is a front elevation of an index or file embodying my improvements, Fig. 2 is a front elevation of one of the record members, detached, Fig. 3 is a rear elevation of the record member shown in Fig. 2, Fig. 4 is an enlarged section on line 4—4 of Fig. 2, Fig. 4ᵃ is a section similar to Fig. 4, showing two of the record members nested together. Fig. 5 is an enlarged section on a line corresponding to the line 5—5 of Fig. 1, showing two record members nested together at the bottom of the guide or support, Fig. 6 is an enlarged section on line 6—6 of Fig. 1, Fig. 7 shows in front elevation a modified form of record member or card mounted on a guide or support of modified form, Fig. 8 is a section on line 8—8 of Fig. 7, Fig. 9 is a fragmentary view of the card, Fig. 10 shows the same form of card mounted on a support of a different type, Fig. 11 is a section on line 11—11 of Fig. 10. Fig. 12 is a transverse section through two cards of the type shown in Figs. 7–11, inclusive, illustrating them as nested together. Fig. 13 is a front view of said cards. Fig. 14 is a view similar to Fig. 13, but illustrates in addition a marker or signal card interposed between the record cards, and Fig. 15 is a section on line 15—15 of Fig. 14.

Referring to the drawing and particularly to Fig. 2, 10 is a record member composed of a flat rectangular main portion 11 on which data is written or printed, and a flap or tongue 12 extending upward at the back of the main portion. The flap or tongue 12 forms in connection with the main portion 11 of the record member a pocket 13 at the rear of the record member open at the top, as shown in Fig. 4. In the form illustrated, the main portion 11 of the record member consists of an index card of usual form on which the record matter is directly written, but I do not limit myself in this respect, as such main portion might be made of some other material than paper and it might carry the data in some less direct manner. Moreover, in the form shown the tongue or flap 12 is made of paper and suitably secured to the main portion 11 near the lower edge of the latter, as shown in Figs. 3 and 4, but I do not limit myself in the broad aspects of the invention to a flexible tongue or flap or to one which is separately applied to the card or other record carrying or pocket forming member.

In Fig. 1 I have shown a plurality of record members 10 grouped together in a substantially upright guide 14. This guide consists of a flat back plate having side retaining flanges 16 and a bottom retaining flange 17. By referring to Figs. 2 and 3 it will be noted that the tongues or flaps 12 are extended beyond the side margins of the card 11, as shown at 18, and the relative dimensions of the guide 15 and record member 10 are such that the side portions 18 of the tongue or flap 12 will extend back of and be retained by the side flanges 16 of the guide when the record member is slid into the guide from the open top portion thereof. The record carrying portion 11, however, will be free of the side flanges 16 of the guide. All of the several record members placed in the guide are nested together in the manner shown in Fig. 5, that is to say, the lower edge of a record member will rest in and be supported by the bottom of the pocket 13 of the next lower record member, while the first mentioned record member will serve in a similar way as a support for the one next above it. By this arrangement the several members will be nested together flatwise in such a manner as to render their upper margins visible to a predetermined extent. The extent of this visibility is, of course, dependent on the points of junction of the tongues 12 with the card members 11, which determine the depth of the pockets on the backs of the cards. In the form shown, the tongues or flaps 12 extend upward beyond the top edges of the corresponding card members but this is not an essential feature.

In making up the index a plurality of cards are nested together in the desired arrangement and slid into the guide 15 from the top, or, if desired, the cards may be placed in position laterally, which is readily permitted by the flexibility of the tongues or flaps, as will be obvious. Certain index data appear on the upper margins of the cards, as shown in Fig. 1, and the whole front face of the card is adapted to carry any desired data or memoranda which can be readily seen when the card in front of the same is flexed outward by the finger, as shown in Fig. 5. When the card is released by the finger it immediately returns to the normal, substantially flat, position with respect to the guide, in which it is held by the other cards or members. When it is desired to insert or remove a card at any particular point, the longitudinally extending group or series of cards is separated for that purpose in an obvious manner by giving a certain number of the cards a sliding movement lengthwise of the guide. It will be apparent that when it is desired to have more than momentary access to the data on the face of one of the cards it may be convenient to separate the group of cards in this same manner. The flexibility of the cards and tongues, in the embodiment illustrated, permits the insertion or removal of a card in a lateral direction when the series has been separated to open up a sufficiently large gap, but if the record members are not made of flexible material this same result may be achieved in several different ways, for instance, by omitting one of the side retaining flanges, and tilting the guide to prevent falling, in which case the record members may be readily slid in place and removed in a lateral direction.

Referring now to the modified form of the device shown in Figs. 7, 8 and 9 each card 20 is provided with a tongue integral therewith. The lower portion of the card is cut on the line 21, as shown in Fig. 9, to present a tongue 22 adapted to be bent back out of the plane of the card and having lateral extensions 22ª adapted to engage the rear surfaces of side flanges 23 bent up from the metal strip 24, which forms the guide or support. In this modification the card may be readily placed in position in the guide by tilting it at an angle to the horizontal so that the tongue 22 will pass back through the space defined by the opposing edges of the flanges 23, after which the card is again moved to its horizontal position so that the tips of the tongue will catch behind the flanges. This form of the device is quite similar to that shown in Figs. 1–6, except for the fact that here the main body portion of the card or other record member is supported at the rear by portions of the upright guide. The body portion of the card or record member is supported from the back at both sides of the center by means of the members 23, or their equivalents, the front surfaces of which are contacted by the rear surface of the body portion of the record member. It will be observed that in this arrangement, as well as that shown in Figs. 1–6, the guide has spaced opposing edge portions with a gap therebetween, and the record members are located at the front of the guide and have tongues extending back into the gap and nesting said members together. Furthermore, in both cases, the tongues extend back of said edge portions to interlock the card positively with the guide, but this is not essential under all circumstances.

In the form shown in Figs. 10 and 11 the same type of card is employed, but the guide or support 25 lies in substantially a single plane, being divided for the greater part of its length into two sections arranged side by side with a gap 26 therebetween. This gap 26 is defined by spaced opposing edge portions of the guide proper, with which portions the tongue 22 is engaged in the manner previously described. In this case also, the guide is provided with spaced opposing edge portions with a gap therebetween, and the record members are located at the front of the guide and have tongues extending backward into the gap and nesting said members together, but the guide is not provided with a special retaining flange or flanges for engaging a side edge or side edges of each record member.

Figs. 12 and 13 show the nested arrangement of two cards or members 20 of the type just described. The rear card is supported at its lower edge 20ª on the rearwardly projecting tongue 22 of the card or member in front of the same, whereby the visibility of the upper margins of the several cards of the series is obtained in substantially the same manner as described in connection with Figs. 1–6.

Figs. 14 and 15 show an improved arrangement of marker or signal adapted to be used with a card index system of the type herein described. Different figures, letters or other characters may be marked on the upper margins of the cards for cross-classification purposes, as usual in card index systems, and I may use in connection with these characters a series of marker or signal cards corresponding to and adapted to point or call attention to the respective cross-classification characters.

In the form shown in Figs. 14 and 15 the letters A, B and C on the upper margins of the cards are supposed to be cross-classification characters, and if it is desired to indicate that the rear card falls under classification B, for example, a marker or signal card 27 will be interposed between said card and the card in front of the same as shown. The signal card is supported on the tongue 22 of the front card, as shown in Fig. 15, and is of such shape or configuration as to extend over, point to, or otherwise call attention to the character B on the rear card. In the form shown the signal card 27 is of triangular shape, having a corner adapted to extend over the character B, one edge of the card being engaged with the tongue 22 in parallelism with the lower edges of the record cards.

It will be understood that a signal card of somewhat different shape will be used in connection with the cross-classification character A, and that still another form of signal card will be used in connection with the cross-classification character C. It will be seen, therefore, that the marker or signal card or member used in connection with a certain record card or member is interposed between said record card or member and the card or member in front of the same and supported on the rearwardly extending tongue of such front card or member. Of course I do not confine myself to any particular shape of the marker elements or to any particular arrangement of the cross-classification characters. In fact the cross-classification characters may be altogether omitted and the signal element itself, by variations of color or of imprinted symbol, may serve alone to attract the attention of the user to any temporary fact of interest relative to the member in front of which the signal stands.

The foregoing description is necessarily a detailed one, in so far as it concerns the particular embodiments of my invention selected for illustration and description, and I reserve the right to use such modifications as are fairly within the scope of the claims.

What I claim is:

1. The combination with a guide having a marginal retaining element, of a plurality of nested record members slidable lengthwise in said guide and each having a portion retained beneath said retaining element; substantially as described.

2. The combination with a guide having spaced opposing edge portions with a gap therebetween, of a plurality of record members located at the front of the guide and having tongues extending backward into said gap and nesting said members together; substantially as described.

3. The combination with a guide having spaced opposing edge portions with a gap therebetween, of a plurality of record members located at the front of the guide and having tongues extending backward through said gap and nesting said members together, said tongues extending back of said edge portions and being interlocked with the guide; substantially as described.

4. The combination with a guide having a main body portion, and a marginal guide flange located out of the plane of the body portion, of a plurality of nested record members slidable in said guide and extending partially into the space between said guide flange and the body of the guide; substantially as described.

5. The combination with a guide having opposing retaining edges spaced from each other, of a plurality of record members, and tongues on said record members nesting them together and extending between and behind said retaining edges; substantially as described.

6. The combination with an upright guide having a retaining edge at one side thereof, of a plurality of substantially flat record carrying members movable up and down at the front of said guide and having portions nesting them together and holding them in place in the guide by extending back of said retaining edge; substantially as described.

7. A record member for indexes, comprising a substantially flat record holding portion, and a central rearwardly and upwardly directed tongue joined to said record portion along a line parallel to the lower edge of said record portion, said tongue forming in conjunction with said record portion an upwardly opening pocket; substantially as described.

8. A record member for indexes, comprising a substantially flat record portion having a central rearwardly and upwardly directed tongue joined integrally with said record portion on a line substantially parallel and adjacent to the lower edge of said record portion; substantially as described.

9. In an index or file, the combination of a plurality of substantially flat record holding members, a central tongue directed rearwardly and upwardly from each member and joined with the body portion of the corresponding member on a line slightly above and substantially parallel to the lower edge of said member, said members being nested together in a predetermined overlapped relation by means of said tongues; substantially as described.

10. In an index or file, the combination of a plurality of substantially flat rectangular record holding members, a single central tongue on each of said members cut integrally therefrom, said tongue joined with the body portion of the corresponding member on a line above and substantially parallel to the lower edge of said member, and said tongue being upwardly and rearwardly directed so as to form a pocket at the rear of the corresponding member, said members being nested together by means of said tongues so that the record holding portions overlap each other; substantially as described.

11. In an index or file, the combination of a plurality of record members, tongues on the respective members nesting them together in overlapped relation, and an upright guide frame for said overlapping members having portions to support said members from the back on opposite sides, said members being individually or collectively movable in said frame in a vertical direction, and being removable from said frame in a lateral direction; substantially as described.

12. In an index or file, the combination of a plurality of record members, each of said members comprising a substantially flat record holding portion having a rearwardly and upwardly directed tongue located substantially at the center of said record holding portion and joined with the latter on a line substantially parallel to the lower edge of said record portion, said members being nested together in overlapped relation by means of said tongues, and an upright open frame in which said overlapped members are guided, and from which they are removable in a lateral direction; substantially as described.

13. In an index or file, the combination of a plurality of record members, each of said members comprising a substantially flat record holding portion having a rearwardly and upwardly directed tongue located substantially at the center of said record holding portion and joined integrally with the latter on a line adjacent and substantially parallel to the lower edge of said record portion, said members being nested together in overlapped relation by means of said tongues, and an upright frame in which said overlapped members are guided, and from which they are removable in a lateral direction, said frame having portions which support said members at both sides of said tongues; substantially as described.

14. In an index or file, a record member comprising a substantially flat record holding portion, and a rearwardly and upwardly directed tongue joined to said record portion along a line parallel to the lower edge of said record portion, said tongue being integral with said record portion at approximately the center of the latter, and forming in conjunction with said record portion an upwardly opening pocket, a similar record member having the lower edge of its record portion entering and supported in said upwardly opening pocket, whereby said record members are held in a predetermined overlapped relation, and a guide frame supporting the record holding portions of said members at opposite sides, and in which said members are movable up and down, substantially as described.

15. In an index or file, a record member comprising a substantially flat record holding portion and a rearwardly and upwardly directed tongue joined to said record holding portion along a line substantially parallel to the lower edge of the latter, and presenting an upwardly opening pocket, a similar record member having its lower edge supported in said pocket, whereby said members are held in a predetermined overlapped relation, and a guide for said overlapped members having spaced opposing edge portions with a gap therebetween, said edge portions supporting said record members at the sides, and said tongue being located in said gap; substantially as described.

16. In an index or file, the combination of a record member, comprising a substantially rectangular record holding portion and a rearwardly and upwardly directed tongue joined to said record portion along a line parallel and adjacent to the lower edge of the latter, a plurality of similar record members having similar tongues, said record members nested together by means of said tongues, and a substantially upright guide having spaced opposing edge portions with a gap therebetween, said edge portions being located at the rear of the record portions of said record members, and underlying the backs of said record portions so as to support the same, and the tongues of the several record members extending into the gap between said opposing edge portions of the guide; substantially as described.

17. In an index or file, the combination of a record member, comprising a substantially flat rectangular record holding portion and a tongue joined to said record holding portion along a line parallel and adjacent to the lower edge of the latter, said tongue extending from said record holding portion in a rearward and upward direction, and being located centrally of said record member, a plurality of similar record members having similar tongues, said record members being nested together in a predetermined overlapped relation by means of said tongues, and a substantially upright open guide frame having spaced opposing edge portions with a gap therebetween, said edge portions being located at the rear of the record portions of said record members, and supporting said record portions from the back on opposite sides of said tongues, and the tongues of the several record members extending into the gap between said opposing edge portions of the guide; substantially as described.

18. In an index, the combination of two record members, a tongue on one of said members nesting them together in overlapped relation, and a marker or signal element interposed and supported between said members; substantially as described.

19. In an index, the combination of two record members, a tongue on one of said members nesting them together in overlapped relation, and a marker or signal card interposed and supported between said members; substantially as described.

20. In an index, the combination of a record member having a rearwardly directed tongue, a second record member behind the first supported on said tongue, and a marker or signal element associated with said second record member in front of the same and likewise supported on said tongue; substantially as described.

21. In an index, the combination of a record member presenting a pocket, and a marker or signal element extending into and supported by said pocket; substantially as described.

22. In an index, the combination of a record carrying member having a tongue portion presenting a pocket, a second record member overlapping the first, and a signal card fitting in said pocket; substantially as described.

23. In an index, the combination of a record member having a pocket at the back thereof, a second record member supported in said pocket and extending upward beyond the first, and a signal card interposed between said members and extending upward beyond the first member; substantially as described.

24. In an index, the combination of a substantially flat record member having a pocket near the lower edge thereof, and a marker or signal element comprising a card having its lower edge supported in said pocket; substantially as described.

25. In an index, the combination of a plurality of record members arranged in a row, said members overlapping each other so as to expose the upper marginal portion of each member, means forming pockets adjacent the lower edges of the respective members, and a marker or signal card supported in at least one of said pockets; substantially as described.

In witness whereof, I have hereunto set my hand on the 1st day of November, 1913.

IRVING FISHER.

Witnesses:
    HENRY E. ROCKWELL,
    M. OLIVE WILLIAMS.